US007855676B2

(12) United States Patent
Ohlsson et al.

(10) Patent No.: US 7,855,676 B2
(45) Date of Patent: Dec. 21, 2010

(54) RADAR LEVEL GAUGE SYSTEM WITH LEAKAGE DETECTION

(75) Inventors: Magnus Ohlsson, Norsholm (SE); Carl-Johan Roos, Mölndal (SE)

(73) Assignee: Rosemount Tank Radar AB, Gothenburg (SE)

( * ) Notice: Subject to any disclaimer, the term of this patent is extended or adjusted under 35 U.S.C. 154(b) by 112 days.

(21) Appl. No.: 12/401,169

(22) Filed: Mar. 10, 2009

(65) Prior Publication Data

US 2010/0231438 A1    Sep. 16, 2010

(51) Int. Cl.
*G01S 13/08* (2006.01)
(52) U.S. Cl. .................................. 342/124; 73/290 R
(58) Field of Classification Search ............... 342/124
See application file for complete search history.

(56) References Cited

U.S. PATENT DOCUMENTS

| 5,872,494 | A | 2/1999 | Palan et al. ............... 333/252 |
| 2002/0053238 | A1* | 5/2002 | Fahrenbach et al. ...... 73/290 R |
| 2004/0173020 | A1 | 9/2004 | Edvardsson ............... 73/290 |
| 2005/0017896 | A1 | 1/2005 | Klofer et al. ............. 342/124 |
| 2005/0223781 | A1 | 10/2005 | Renk et al. ................. 73/46 |
| 2006/0225499 | A1* | 10/2006 | Gravel et al. ............. 73/290 V |

FOREIGN PATENT DOCUMENTS

WO    WO 2004/076982    9/2004

OTHER PUBLICATIONS

The International Search Report from PCT/SE2010/050264, dated May 27, 2010.
The Written Opinion from PCT/SE2010/050264, dated May 27, 2010.

* cited by examiner

*Primary Examiner*—Thomas H. Tarcza
*Assistant Examiner*—Timothy A Brainard
(74) *Attorney, Agent, or Firm*—Westman, Champlin & Kelly, P.A.

(57) ABSTRACT

A radar level gauge system comprising a transceiver for generating, transmitting and receiving electromagnetic signals; an antenna arranged to direct transmitted electromagnetic signals towards a surface of the product contained in the tank, and to return reflected electromagnetic signals resulting from reflections at impedance transitions encountered by the transmitted electromagnetic signals back to the transceiver; and a hollow waveguide connecting the transceiver and the antenna for guiding the electromagnetic signals therebetween. The radar level gauge system further comprises a leak indication member being movably arranged inside the hollow waveguide in such a way that a force resulting from leakage of the fluid at the sealing member causes a movement of the leak indication member which causes a change in at least one microwave propagation characteristic of the hollow waveguide.

17 Claims, 7 Drawing Sheets

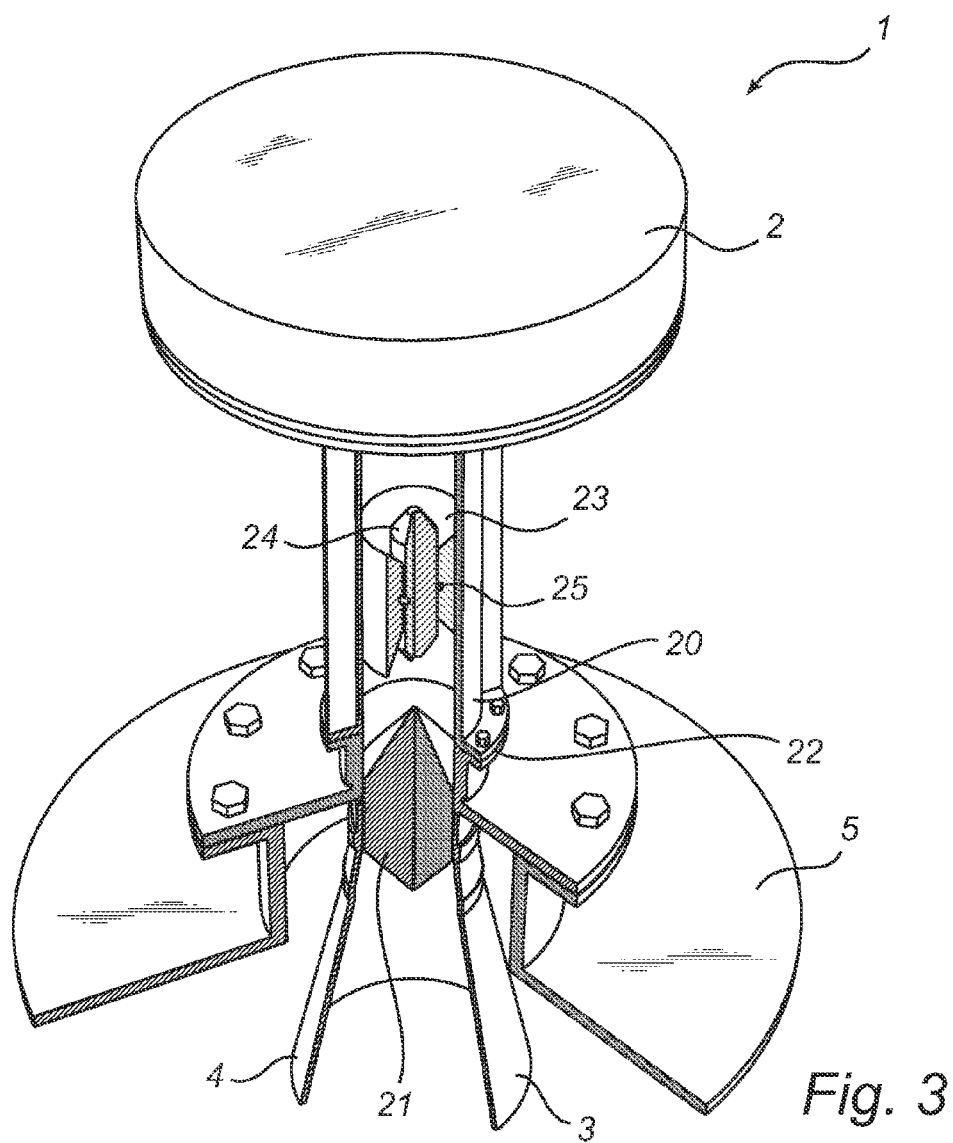
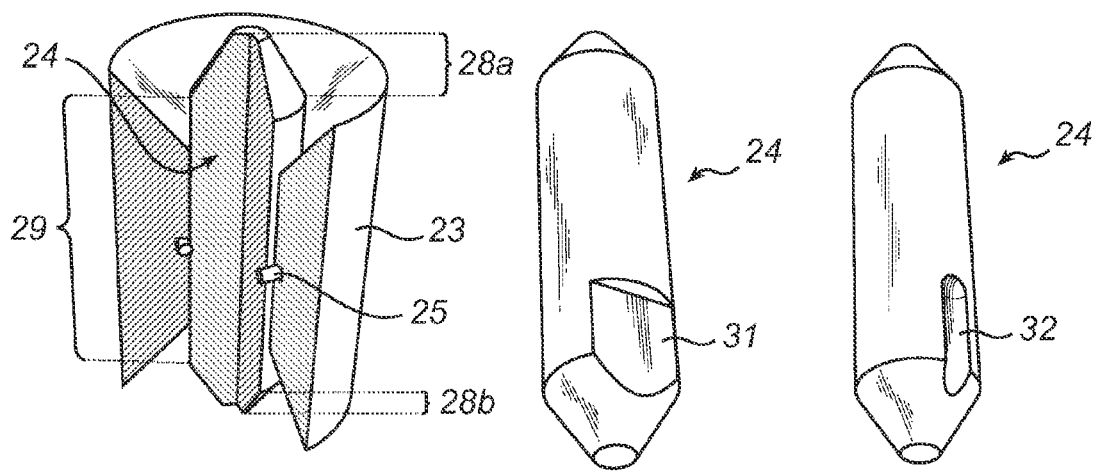
Fig. 3
Fig. 4a  Fig. 4b  Fig. 4c

RADAR LEVEL GAUGE SYSTEM WITH LEAKAGE DETECTION

TECHNICAL FIELD OF THE INVENTION

The present invention relates to a radar level gauge system for determining a filling level of a product contained in a tank and to a method for detecting leakage of fluid in a radar level gauge system.

TECHNICAL BACKGROUND

Radar level gauge systems are currently in use in a variety of fields of application for accurate filling level determination. For determining the filling level of a product by means of a radar level gauge system, electromagnetic signals are transmitted and propagated, usually by means of an antenna, towards a surface of the product, where signals are reflected. The reflected signals are received by the radar level gauge system, and the distance between a reference position and the surface of the product is determined by comparing the transmitted signals with the reflected signals. Based on this distance, the filling level can be determined.

Most radar level gauge systems on the market today are either systems that determine the distance to the surface of the product contained in the tank based on the difference in time between transmission of a pulse and reception of its reflection at the surface of the product, or systems that determine the distance to the surface based on the phase difference between a transmitted frequency-modulated signal and its reflection at the surface. The latter type of systems are generally referred to as being of the FMCW (Frequency Modulated Continuous Wave) type. There are also radar level gauge systems that are a mix between the two types mentioned above.

In many applications, especially when the product in the tank is a fluid, such as a liquid or a gas, it may be important to prevent leakage at the radar level gauge system from the interior of the tank to the exterior of the tank. To this end, radar level gauge systems are typically provided with at least one process seal.

In case of failure of the seal(s) of a radar level gauge system, there will be a leakage of, potentially harmful, fluid from the tank to the surrounding atmosphere.

According to one approach for minimizing the risk and/or loss of product associated with the leakage, US 2006/0225499 discloses a sealing system comprising a primary seal, a secondary seal and a relief seal. In case of failure of the primary seal and the secondary seal, gas from the interior of the tank is allowed to leak out from the tank through the relief seal in such a way that an audible or aromatic annunciation is provided.

Although this approach provides an indication of leakage from the tank, there still appears to be room for improvement, in particular with regard to the ability to detect the leakage from a remote location and/or the reliability of the leakage detection.

SUMMARY OF THE INVENTION

In view of the above-mentioned and other drawbacks of the prior art, a general object of the present invention is to provide an improved radar level gauge system.

According to a first aspect of the present invention, it is provided a radar level gauge system, for determining a filling level of a product contained in a tank, the radar level gauge system comprising: a transceiver for generating, transmitting and receiving electromagnetic signals; an antenna arranged to direct transmitted electromagnetic signals towards a surface of the product contained in the tank, and to return reflected electromagnetic signals resulting from reflections at impedance transitions encountered by the transmitted electromagnetic signals back to the transceiver; a hollow waveguide connecting the transceiver and the antenna for guiding the electromagnetic signals therebetween; a sealing member arranged to seal the waveguide to prevent fluid from passing into the waveguide from an interior of the tank; and processing circuitry connected to the transceiver and configured to determine the filling level based on the reflected electromagnetic signals, wherein: the radar level gauge system further comprises a leak indication member being movably arranged inside the hollow waveguide in such a way that a force resulting from leakage of the fluid at the sealing member causes a movement of the leakage indication member when acting thereon; and the hollow waveguide is configured in such a way that the movement of the leakage indication member causes a change in at least one microwave propagation characteristic of the hollow waveguide.

The tank may be any container or vessel capable of containing a product, and may be metallic, or partly or completely non-metallic, open, semi-open, or closed.

By the term "hollow waveguide" should, in the context of the present application, be understood a waveguide comprising a dielectric surrounded by an electrically conductive shell. In such a waveguide, electromagnetic waves are contained through interactions with the electrically conductive shell. The electrically conductive shell may a continuous conductive surface, or may be more or less perforated depending on the desired propagation characteristics of the hollow waveguide. Furthermore, the hollow waveguide may have various cross-sections, such as circular or rectangular, and may have different cross-sections in different sections thereof.

Moreover, the dielectric which is surrounded by the electrically conductive shell may be any suitable dielectric. To allow for movement of the leakage indication member, the hollow waveguide comprised in the radar level gauge system according to various embodiments of the present invention may advantageously comprise a deformable or easily movable/shiftable dielectric, such as air, at least in the vicinity of the leakage indication member.

It should be noted that the transceiver may be connected to the antenna either directly through the hollow waveguide, or via a cable or other connection means arranged between the transceiver and the hollow waveguide.

A "fluid" is a substance, which alters its shape in response to any force and which tends to flow or to conform to the outline of any chamber in which it may be contained. The term fluid thus includes, for example, gases and liquids.

In the context of the present application, "microwave propagation characteristic(s)" should be understood as including any characteristic of the propagation of microwaves through the hollow waveguide. Such microwave propagation characteristics may, for example, include the cut-off frequencies of the mode(s) which is/are supported by the waveguide, the reflection and transmission properties of the waveguide, etc.

It should, furthermore, be noted that the processing circuitry may be provided as either of a separate physical component, separate hardware blocks within a single component, or software executed by one or several microprocessors.

The present invention is based upon the realization that an improved leakage detection can be achieved by converting the presence of leaked process fluid in the hollow waveguide to a detectable change in at least one microwave propagation characteristic of the hollow waveguide. The present inventors have further realized that the presence of the leaked process fluid can be converted to a change in at least one microwave propagation characteristic by arranging a leakage indication member inside the hollow waveguide in such a way that a movement of the leakage indication member causes a change in at least one microwave propagation characteristic of the hollow waveguide.

The change in microwave propagation characteristic(s) can be detected by the processing circuitry comprised in the radar level gauge system, which may provide a signal indicative of the occurrence of a leakage, thereby enabling rapid and/or remote detection of the leak. Hereby, action can be taken which may effectively minimize any damage and/or loss of product which may otherwise have been caused by the leakage.

Additionally, the leakage detection capability provided by the radar level gauge system according to the present invention is cost-efficient since no additional detector or other sensing equipment is required for detecting the leakage.

For enabling reliable leakage detection, the hollow waveguide may be configured to increase reflection of the transmitted electromagnetic signals in the hollow waveguide following the movement of the leakage indication member.

Such an increased reflection may, for example, be achieved through a change in the cut-off frequency of the hollow waveguide.

The leakage indication member may advantageously comprise a plug being movably arranged in the hollow waveguide to at least temporarily seal the hollow waveguide. The plug thus acts as a "secondary seal" such that a pressure builds up in the hollow waveguide in case of failure of the sealing member—the "primary seal".

When the pressure is sufficiently high, the force acting on the plug will cause the plug to move relative to the hollow waveguide, resulting in the desired change in microwave propagation characteristic(s).

The sealing functionality of the plug can be achieved in various ways, such as by providing the plug in a press-fit arrangement with a resilient member, such as one or several O-rings, C-rings or similar.

Furthermore, the plug may be arranged to move in a wave-guiding direction of the hollow waveguide when subjected to the force resulting from leakage of the fluid at the sealing member. In the case of a tubular hollow waveguide, this means that the plug may be arranged to move in the axial direction of the hollow waveguide. Hereby, a detectable change in microwave propagation characteristics of the hollow waveguide can be achieved relatively easily and conveniently.

To provide for the desired combination of high transmission when there is no leakage and a detectable change in microwave propagation characteristics when the leakage indication member has moved due to leakage at the sealing member, the hollow waveguide may be locally adapted to compensate for the influence of the leakage indication member on the microwave propagation properties of the hollow waveguide.

When the leakage indication member is provided in the form of a plug, the hollow waveguide may thus have a portion with a reduced internal cross-section (of the electrically conductive shell) where the plug is arranged.

To facilitate production of the hollow waveguide, this portion with the reduced internal cross-section may advantageously be defined by an at least partly conductive sleeve member arranged in the hollow waveguide.

According to one embodiment, the plug may be at least partly made of a dielectric material having a dielectric constant differing from that of an adjacent dielectric material inside the hollow waveguide. It should be noted that in the case when the adjacent dielectric material inside the hollow waveguide is air, any dielectric plug will have dielectric constant which is higher than that of air.

By positioning the at least partly dielectric plug at a portion of the hollow waveguide having a locally reduced cross-section, the higher dielectric constant of the plug can be compensated for, such that the plug is practically invisible to the electromagnetic signals guided by the waveguide. When the dielectric plug is moved away from the portion of the hollow waveguide having the locally reduced cross-section, a significant change in microwave propagation characteristic(s) of the hollow waveguide can be achieved, which allows for convenient and reliable leakage detection.

According to another embodiment, the radar level gauge system may comprise an at least partly dielectric spacing member arranged in the hollow waveguide, the plug may be electrically conductive; and may be spaced apart from a wall of the hollow waveguide by the spacing member.

Using this configuration, similar behavior as described above for the case with a dielectric plug can be achieved.

According to a further embodiment, the plug may comprise a non-rotationally symmetrical electrically conductive member, and the plug may be arranged to rotate when being subjected to the force resulting from leakage of the fluid at the sealing member.

A rotation of such a non-rotationally symmetrical conductive member will result in a change in the microwave propagation characteristics of the hollow waveguide.

The non-rotationally symmetrical electrically conductive member may be at least partly embedded in a dielectric material.

Advantageously, the plug may be arranged in the hollow waveguide to perform a spiraling motion when being subjected to the force resulting from leakage of the fluid at the sealing member, whereby the force resulting from the leaking fluid can conveniently be converted to a rotational movement of the rotationally non-symmetrical conductive member.

In the various embodiments of the radar level gauge system according to the present invention where the leakage indication member comprises a plug, the plug may advantageously comprise an impedance matching portion at least one of its ends to minimize transmission losses due to the presence of the leakage indication member when no leakage (and thus no movement) has occurred.

The impedance matching portion may advantageously have a smaller extension transversally to a direction of propagation of the electromagnetic signals than a main body of the plug Furthermore, the radar level gauge system may advantageously be configured to allow passage of leaking fluid following a given movement of the leakage indication member, whereby it can be ensured that sufficient transmission through the hollow waveguide can be maintained to allow level determination after a leakage has been detected.

To provide for the desired passage of leaking fluid without any further movement of the leakage indication member, at least one of the leakage indication member, the waveguide and any spacing member provided between the leakage indication member and the waveguide may be provided with a cut-out along at least a portion thereof.

According to a second aspect of the present invention it is provided a method of detecting leakage of fluid in a radar level gauge system for determining a filling level of a product contained in a tank, the radar level gauge system comprising a transceiver, an antenna and a hollow waveguide connecting the antenna and the transceiver, the hollow waveguide having a leakage indication member movably arranged therein, wherein the method comprises the steps of: generating and transmitting electromagnetic signals using the transceiver; propagating the transmitted electromagnetic signals through the hollow waveguide towards the antenna; and detecting fluid leakage through the hollow waveguide by detecting a change in at least one microwave propagation characteristic of the hollow waveguide, caused by movement of the leakage indication member.

Further features and effects of this second aspect of the present invention are largely analogous to those described above in relation to the first aspect of the invention.

BRIEF DESCRIPTION OF THE DRAWINGS

These and other aspects of the present invention will now be described in more detail, with reference to the appended drawings showing an example embodiment of the invention, wherein:

FIG. 3 is a partly broken perspective view of the radar level gauge system in FIG. 1;

FIG. 4a is a schematic illustration of an exemplary kit for installment of a leakage indication member in a radar level gauge system;

FIG. 4b is a schematic illustration of a first exemplary leakage indication member in the form of a plug having a cut out for allowing passage of leaking fluid;

FIG. 4c is a schematic illustration of a second exemplary leakage indication member in the form of a plug having a cut out for allowing passage of leaking fluid;

FIG. 7b schematically illustrates the reflection for an exemplary signal spectrum for different rotation angles of the leakage indication member in FIG. 7a.

DETAILED DESCRIPTION OF A PREFERRED EMBODIMENT OF THE INVENTION

In the present description, embodiments of the present invention are mainly described with reference to a radar level gauge system in which the electromagnetic signals to be transmitted are provided from the transceiver to the antenna through an air-filled hollow waveguide with a circular cross-section. It should be noted that this by no means limits the scope of the present invention, which is equally applicable to a radar level gauge system having a hollow waveguide with another cross-section, such as rectangular, and/or having a hollow waveguide being at least partly filled with another dielectric medium and/or having more than one hollow waveguide for transmitting/receiving the electromagnetic signals.

Figure 1:
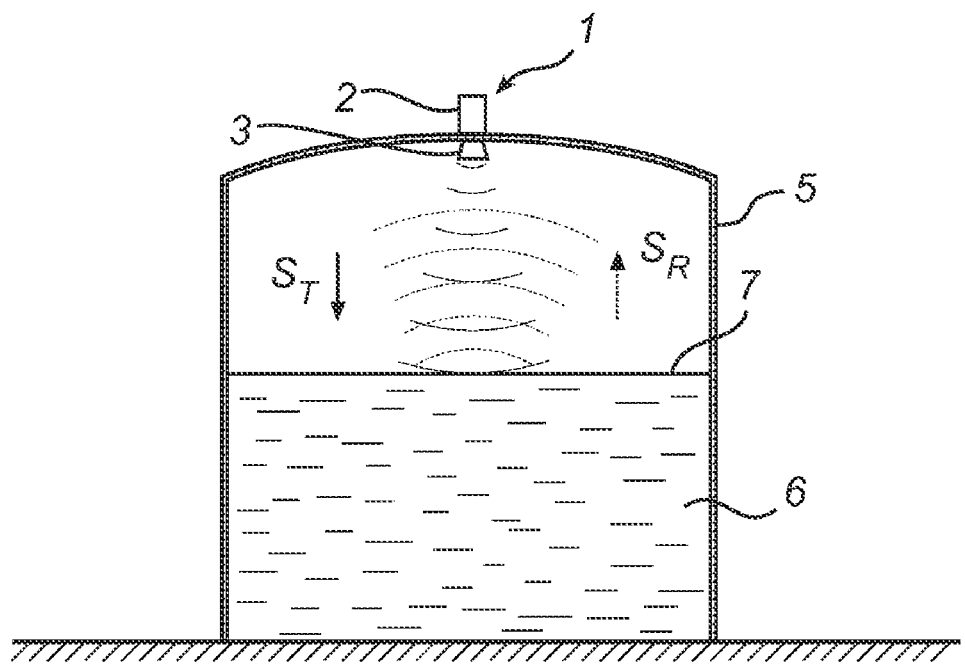
FIG. 1 schematically illustrates a radar level gauge system according to an embodiment of the present invention.

FIG. 1 schematically illustrates a radar level gauge system 1 according to an embodiment of the present invention, comprising a measurement electronics unit 2, and an antenna device 3. The radar level gauge system 1 is provided on a tank 5, which is partly filled with a product 6 to be gauged. By analyzing transmitted signals $S_T$ being radiated by the antenna 3 towards the surface 7 of the product 6, and echo signals $S_R$ traveling back from the surface 7, the measurement electronics unit 2 can determine the distance between a reference position and the surface 7 of the product 6, whereby the filling level can be deduced. It should be noted that, although a tank 5 containing a single product 6 is discussed herein, the distance to any material interface present in the tank 5 can be measured in a similar manner.

Figure 2:
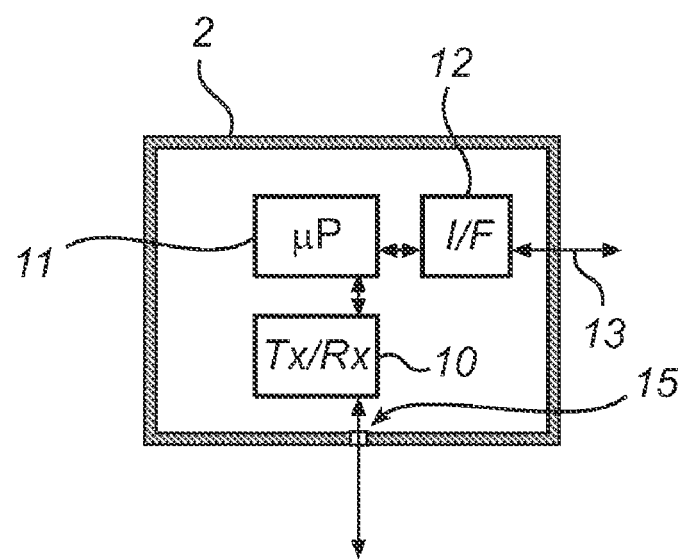
FIG. 2 is a schematic illustration of the measurement electronics unit comprised in the radar level gauge system in FIG. 1.

As is schematically illustrated in FIG. 2, the electronics unit 2 comprises a transceiver 10 for transmitting and receiving electromagnetic signals, a processing unit 11, which is connected to the transceiver 10 for control of the transceiver and processing of signals received by the transceiver to determine the filling level of the product 6 in the tank 5.

The processing unit 11 is, furthermore, connectable to external communication lines 13 for analog and/or digital communication via an interface 12. Moreover, although not shown in FIG. 2, the radar level gauge system 1 is typically connectable to an external power source, or may be powered through the external communication lines 13. Alternatively, the radar level gauge system 1 may be configured to communicate wirelessly.

Although being shown as separate blocks in FIG. 2, several of the transceiver 10, the processing circuitry 11 and the interface 12 may be provided on the same circuit board.

Referring to the partly broken perspective view of the radar level gauge system 1 in FIG. 3, the transceiver (not visible in FIG. 3) in the electronics unit 2 is connected to the antenna 3 via a hollow waveguide 20.

The antenna 3 is here illustrated as a horn antenna. However, other types of aerials or antennas can be used as well, such as a fixed or movable parabolic antenna, a conical antenna, a transmission line or a straight tube aerial. The hollow waveguide may be sealed by a sealing member 21 in the form of a dielectric material filling at least part of the hollow waveguide 20. This sealing member 21 acts as a primary seal for the radar level gauge system 1 preventing fluid from passing from the interior of the tank 5 to the exterior thereof through the hollow waveguide 20. Further, there may be provided a waveguide joint 22, enabling the enclosed electronics units 2 to be detached from and attached to the antenna 3 under maintained sealing of the tank 5.

Various radar principles may be employed for the radar level gauge system 1. One of these is the impulse delay method (pulse radar method), another is the frequency modulated continuous wave (FMCW) radar method. In the FMCW radar method, the delay is determined in an indirect manner by transmitting a frequency modulated signal and creating a difference between the transmitted and the received momentary frequency. The pulse radar method, on the other hand, uses the radiation of short microwave pulses, also known as bursts, wherein the direct time duration is determined between the transmission and the reception of the individual pulses. The system may use pulsed or continuously emitted radiation. In case pulsed signals are used, the signals can be DC pulses with a length of about 2 ns or less, with a frequency in the order of MHz, at average power levels in the nW or μW area. Alternatively, the pulses may be modulated on a carrier wave of a GHz frequency.

Inside the hollow waveguide 20, a sleeve member 23 is provided, and a leakage indication member 24 in the form of a plug is movably arranged in the sleeve member 23. To provide at least temporary sealing, an O-ring 25 is arranged between the sleeve member 23 and the plug 24.

In case of leakage at the primary seal 21, fluid will pass the primary seal 21 to build up a pressure at the secondary seal provided by the plug 24. When a sufficient pressure has built up at the secondary seal, the plug 24 will be moved upwards in the hollow waveguide 20 until the leaking fluid can pass the secondary seal to exit through the hollow waveguide 20.

When the plug 24 is moved upwards in the hollow waveguide 20, the propagation characteristics of the waveguide 20 will change, leading to a change in the properties of the electromagnetic signals received by the transceiver 10.

It may be desirable to configure the leakage indication member 24 and/or the sleeve member 23 (if applicable) and/or the hollow waveguide 20 to minimize the influence of the leakage indication member 24 when there is no leakage at the primary seal 21.

To that end, various impedance matching designs may be implemented. For example, referring to FIG. 4a, the plug 24 may exhibit a decreased cross-section at end portions 28a-b thereof as compared to its main body 29. Alternatively or in combination therewith, the sleeve member 23 may exhibit a gradually increasing lateral dimension at its end portions.

Figure 7A:
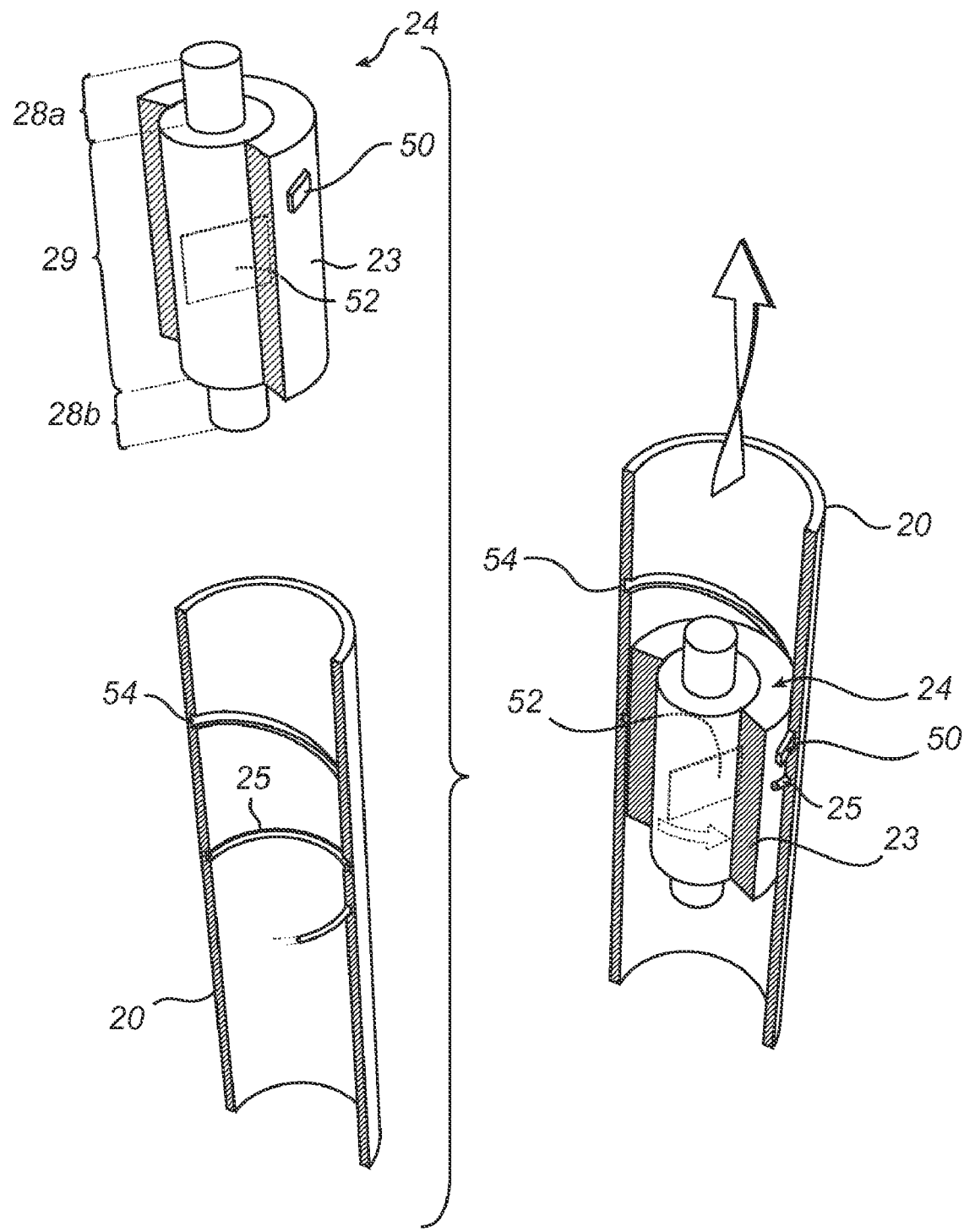
FIG. 7a schematically illustrates a portion of a hollow waveguide comprised in a third embodiment of the radar level gauge system according to the invention, in which a force due to leakage at the sealing member results in rotation of the leakage indication member.

It should be noted that various other impedance matching designs are possible and well in reach of the skilled person. For example, as is schematically illustrated in FIG. 7a, the cross-section of the end portions 28a-b of the plug 24 may decrease step-wise, preferably in so-called λ/4-sections. Moreover, impedance matching can be achieved using a composite structure with materials having suitable properties. For example, a conductive member could be provided at the end portions 28a-b of the plug 24 to achieve the desired impedance matching.

Furthermore, again referring to FIG. 3, it may often be desirable to enable continued determination of the filling level of the product 6 in the tank 5 even following leakage at the primary seal 21. Therefore, the leakage indication member 24 and/or the sleeve member 23 and/or the hollow waveguide 20 may be configured to allow passage of leaking fluid past the leakage indication member 24 following a movement of the leakage indication member 24, which is sufficiently small to still allow sufficient transmission of the electromagnetic signals $S_T$, $S_R$ through the hollow waveguide 20.

FIGS. 4b-c schematically illustrate two possible designs for enabling passage of the leaking fluid following a certain movement of the plug 24. In the plug 24 in FIG. 4b, a first cut-out 31 is shown providing a fluid passage past the O-ring 25 following a certain displacement of the plug 24, and in the plug 24 in FIG. 4c another cut-out 32 serving the same purpose is shown.

In the following, a number of exemplary embodiments of the radar level gauge system according to the present invention will be described, utilizing different arrangements for enabling indication of leakage at the primary seal 24 of the radar level gauge system.

Figure 5A:
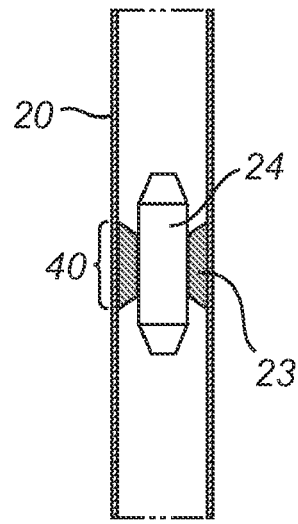
FIG. 5a schematically illustrates a portion of a hollow waveguide comprised in a first embodiment of the radar level gauge system according to the invention and the reflection for an exemplary signal spectrum.
Figure 5A:
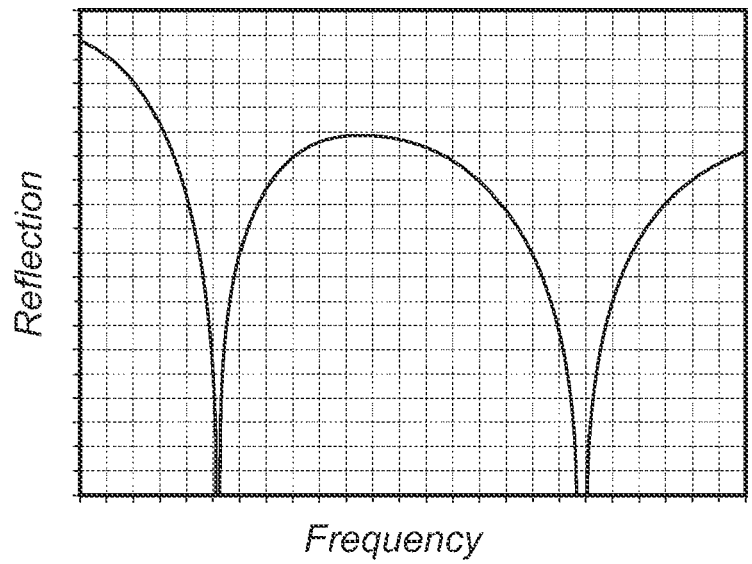
Figure 5B:
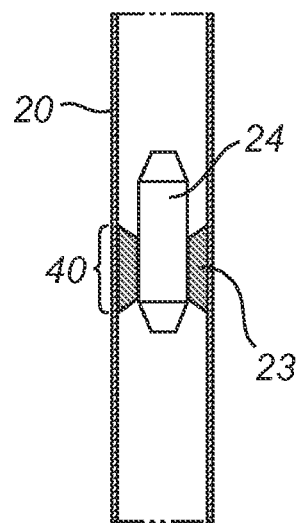
FIG. 5b schematically illustrates the system in FIG. 5a with the leakage indication member having been displaced due to a leakage at the sealing member and the resulting reflection.
Figure 5B:
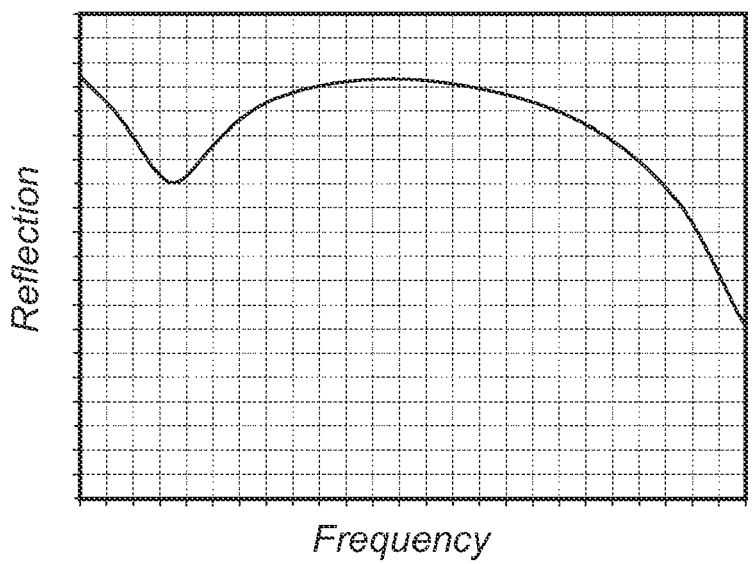

With reference to FIGS. 5a-b, a first exemplary embodiment will be described, in which a circular air-filled hollow waveguide 20 with a diameter of 8.1 mm is provided with a portion 40 with reduced cross-section. The portion with reduced cross-section is, in the present exemplary case, achieved by a conductive sleeve 23 that is fixed to the hollow waveguide 20, for example through press-fit. At the narrow portion 40 with reduced cross-section, the diameter is 4.8 mm. As is schematically illustrated in FIG. 5a, a dielectric plug 24 is provided at the narrow portion 40 of the hollow waveguide 20. In the exemplary embodiment illustrated in FIGS. 5a-b, the plug 24 is made of PPS (Polyphenylene sulfide) with a permittivity $\in_r$ of 3.0. Obviously, other dielectric materials having other permittivity values may be used, and the dimensions of the various components may then be adjusted accordingly.

When there is no leakage at the primary seal (not shown in FIGS. 5a-b), the plug 24 is centered in the narrow portion 40 of the waveguide 20 as shown in FIG. 5a. With the materials and dimensions selected for this particular example, the transmission of microwave signals through the waveguide 20 can take place as shown in the diagram in FIG. 5a.

If, however, there is a leakage of fluid at the primary seal, there will be a force acting on the plug 24, and the plug 24 will be displaced relative to the narrow portion 40 of the waveguide 20 as is schematically illustrated in FIG. 5b. In FIG. 5b, a displacement upwards of the plug 24 of 2 mm is indicated, and as can be seen in the diagram, the reflection of microwave signals has been affected considerably. For a displacement of 2 mm, sufficient transmission is still available to enable determination of the filling level of the tank. Further displacement provides an even more significant change in the reflection of microwave signals, until there is complete reflection in the illustrated microwave band for a displacement of about 7 mm or more.

As described above in connection with FIGS. 4b-c, the maximum displacement of the plug 24 can be controlled by providing a flow path for the fluid to pass the plug 24 following displacement thereof.

Figure 6A:
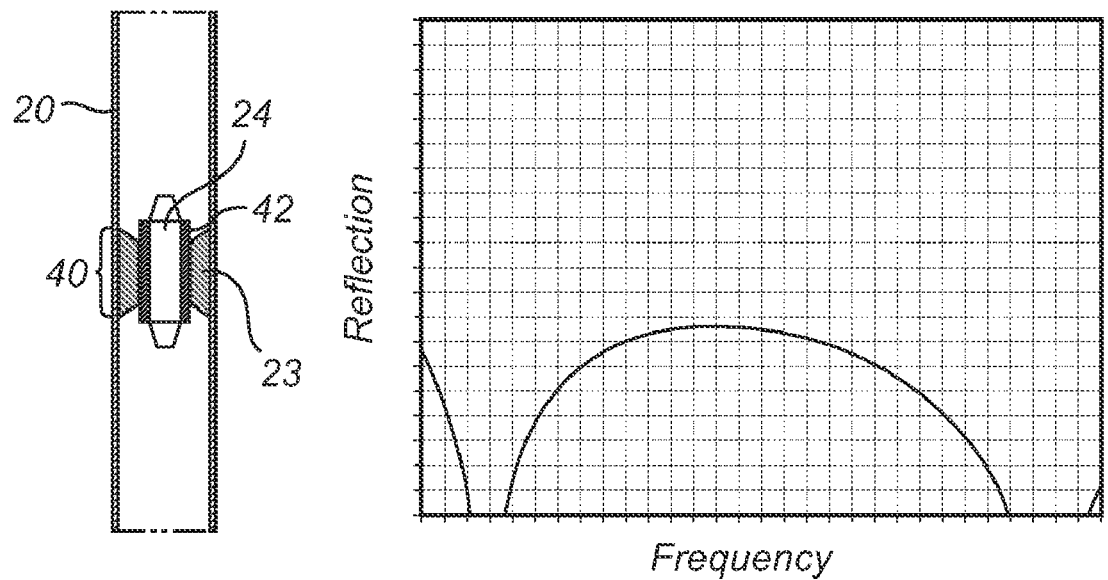
FIG. 6a schematically illustrates a portion of a hollow waveguide comprised in a second embodiment of the radar level gauge system according to the invention and the reflection for an exemplary signal spectrum.
Figure 6B:
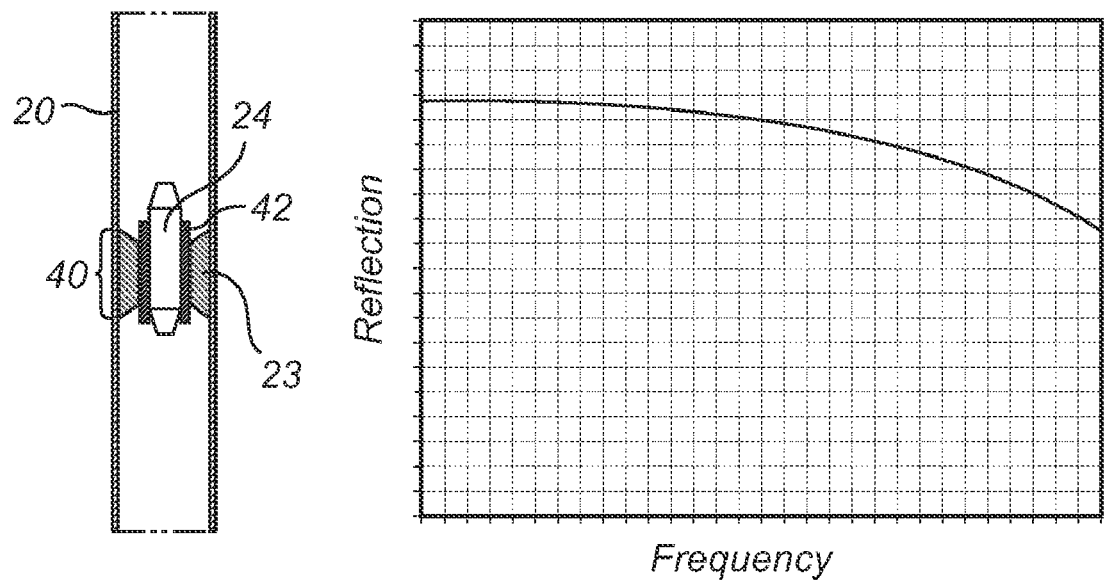
FIG. 6b schematically illustrates the system in FIG. 6a with the leakage indication member having been displaced due to a leakage at the sealing member and the resulting reflection.

With reference to FIGS. 6a-b, a second exemplary embodiment will be described, in which a circular air-filled hollow waveguide 20 with a diameter of 8.1 mm is provided with a portion 40 with reduced cross-section. The portion with reduced cross-section is, in the present exemplary case, achieved by a conductive sleeve 23 that is fixed to the hollow waveguide 20, for example through press-fit. At the narrow portion 40 with reduced cross-section, the diameter is 4 mm. At the narrow portion 40, a dielectric sleeve member 42 is fixedly arranged, and a metal plug 24 is movably arranged in the dielectric sleeve member 42. The diameter of the metal plug is 2.5 mm. In the exemplary embodiment illustrated in FIGS. 6a-b, the dielectric sleeve 42 is made of PTFE (Polytetrafluoroethylene). Obviously, other dielectric materials may be used, and the dimensions of the various components may then be adjusted accordingly.

In analogy with the embodiment described above in connection with FIGS. 5a-b, FIG. 6a illustrates the transmission of microwave signals when there is no leakage at the primary seal 21 and the metal plug 24 is centered in the dielectric sleeve 42, and FIG. 6b illustrates the transmission of microwave signals when the plug 24 has been displaced a distance of 1 mm. For larger displacements, the reflection increases to be almost complete for displacements of 4 mm or more.

Figure 7B:
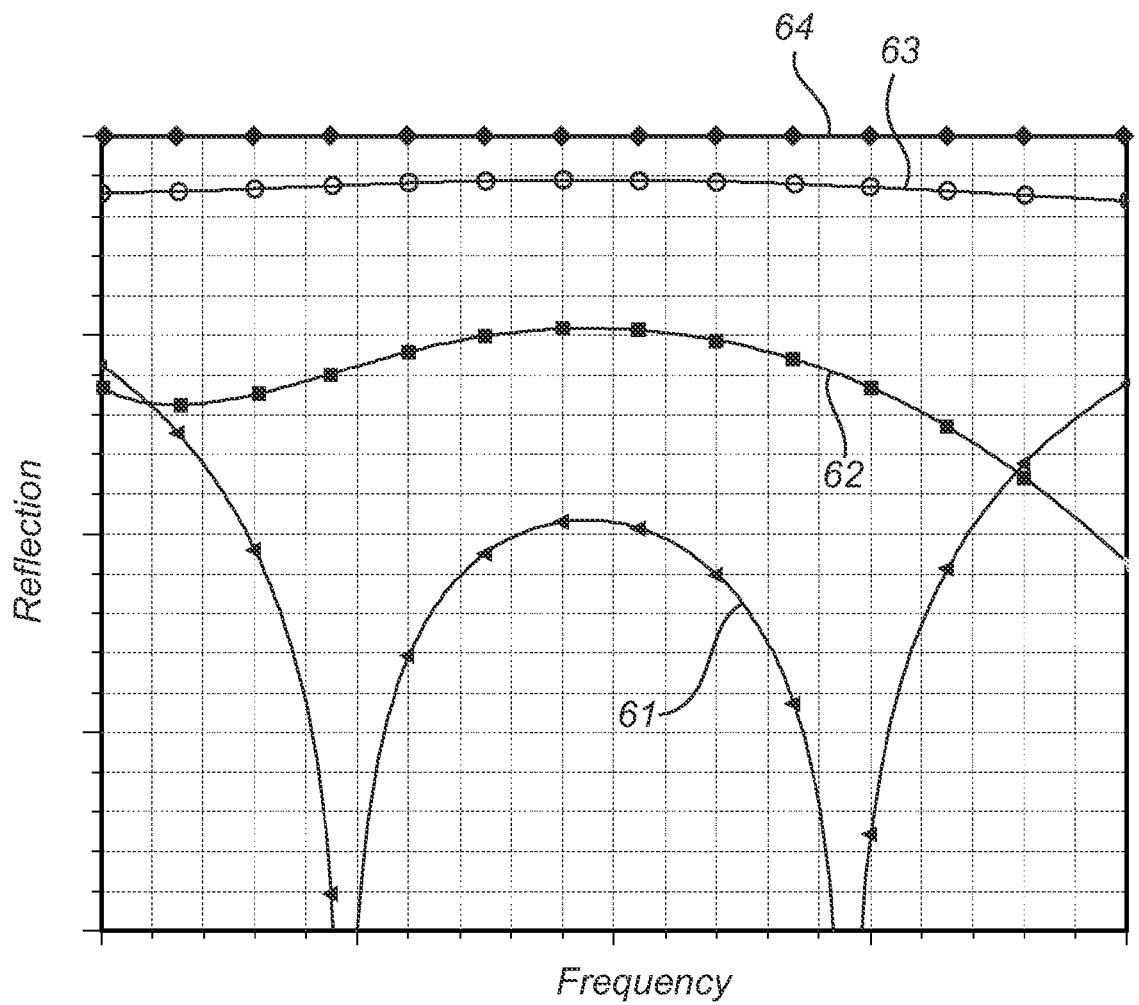

In the embodiments described above in connection with FIGS. 5a-b and FIGS. 6a-b, the change in microwave propagation characteristics is achieved through displacement in the hollow waveguide 20 of a plug 24. With reference to FIGS. 7a-b, a further embodiment will be described, in which a different principle is used to achieve the desired change in signal propagation characteristics.

In the exemplary embodiment in FIG. 7a, the hollow waveguide 20 is provided with a spiraling tap 50 on the inner surface thereof. As is illustrated in FIG. 7a, a leakage indication member 24 is arranged. In the presently illustrated embodiment, the leakage indication member 24 is provided in the form of a dielectric plug having a metal plate 52 embedded therein, and being surrounded by a conductive sleeve member 23. The conductive sleeve member 23 has, as is shown in FIG. 7a, a spiraling groove 54 which accommodates the thread 50 in the hollow waveguide. To provide for impedance matching, the plug 24 has end portions 28a-b with a smaller cross-section than the main body 29 of the plug 24. In the embodiment of FIG. 7a, the end portions 28a-b are substantially cylindrical and have lengths corresponding to a quarter of the wavelength (at the center frequency) of the transmitted electromagnetic signals $S_T$.

To provide at least temporary sealing, an O-ring 25 may be arranged between the sleeve member 23 and the hollow waveguide 20.

As is schematically indicated in FIG. 7a, displacement of the leakage indication member 24 due to a force acting thereon caused by pressure from process fluid leaking past the primary seal 21 (not visible in FIG. 7a, see FIG. 3) will be translated into a rotation of the metal plate 52 embedded in the plug 24. This rotation enables detection of a leakage at the primary seal 21. By, for example, providing the transmitted electromagnetic signals $S_T$ as linearly polarized electromagnetic waves, the angular position of the metal plate 52 will influence the transmission of the electromagnetic signals $S_T$ through the hollow waveguide 20 as is schematically indicated in the diagram in FIG. 7b.

In the exemplary embodiment of the radar level gauge system 1 resulting in the transmission behavior indicated in the diagram in FIG. 7b, the hollow waveguide is air-filled and has a diameter of 21 mm. The dielectric plug 24 is made of PTFE and has a diameter of 15 mm.

Referring to FIG. 7b, the first curve 61, with the lowest reflection (closest to the bottom of the diagram in FIG. 7b) corresponds to the case with there is no force acting on the leakage indication member 24 and the metal plate 52 is oriented orthogonally to the plane of polarization of the E-field of the transmitted electromagnetic signals $S_T$.

In this position of the metal plate 52 (here referred to as having a rotation of 0°), the transmitted electromagnetic signals $S_T$ are thus allowed to pass through the hollow waveguide 20 for regular level determination.

The second curve 62 from the bottom of the diagram in FIG. 7b illustrates the case when the plug 24 has been translated by 3 mm, which in the presently illustrated exemplary configuration results in a rotation the embedded metal plate 52 of 30°. In this position of the leakage indication member 24, a clear leakage indication is provided while at the same time allowing continued filling level determination.

Further displacement of the plug 24 results in further rotation of the embedded metal plate 52, which in turn results in increased reflection of the transmitted electromagnetic signals $S_T$, which is indicated by the remaining curves 63, 64 in FIG. 7b, which correspond to rotations of the metal plate 52 of 60° and 90°, respectively.

Having now described various exemplary embodiments of the radar level gauge system according to the present invention, an embodiment of the method of the invention will be described below with reference to the schematic flow-chart in FIG. 8.

Figure 8:
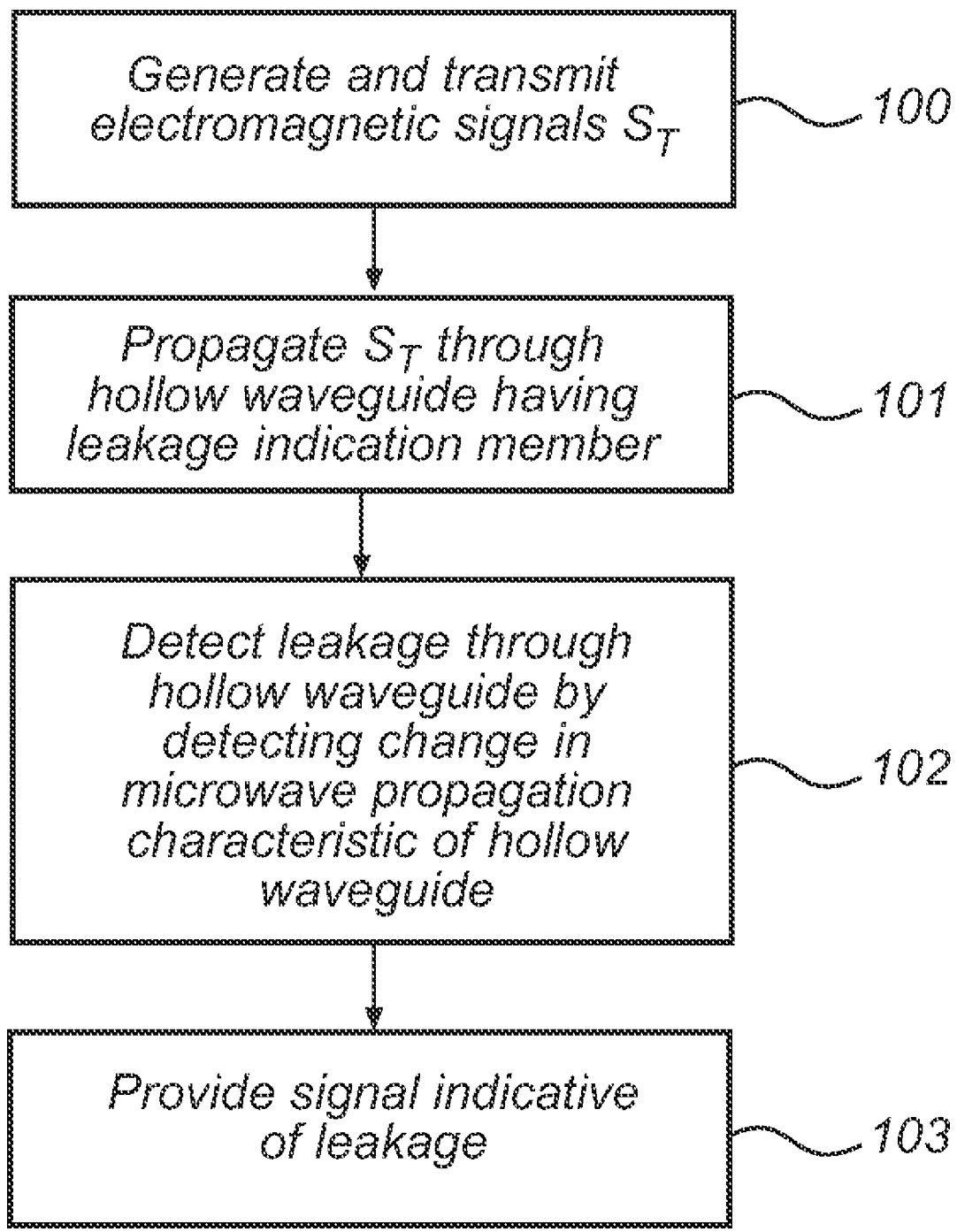
FIG. 8 is a flow-chart schematically illustrating an embodiment of the method according to the present invention.

Referring to FIG. 8, electromagnetic signals $S_T$ are, in a first step 100, generated and transmitted by a transceiver 10 comprised in the electronic unit 2 of a a radar level gauge system 1 according to various embodiments of the present invention.

In the following step 101, the transmitted electromagnetic signals $S_T$ are propagated through a hollow waveguide 20 comprised in the radar level gauge system 1. The hollow waveguide 20 is provided with a leakage indication member 24 that is arranged therein to move when a force acts thereon. The waveguide 20 is configured in such a way that a movement of the leakage indication member causes a change in at least one microwave propagation characteristic of the waveguide 20.

A leakage of process fluid through the hollow waveguide 20 will result in movement of the leakage indication member 24, which is detected in the next step 102. The detection of the leakage through detection of the change in microwave propagation characteristic(s) of the waveguide 20 may advantageously be performed by the processing circuitry 11 comprised in the electronics unit 2 of the radar level gauge system.

In the final step 103, a signal indicating the detected leakage is provided, enabling suitable action. Such a signal may advantageously be provided by the processing circuitry 11.

What is claimed is:

1. A radar level gauge system, for determining a filling level of a product contained in a tank, said radar level gauge system comprising:

a transceiver for generating, transmitting and receiving electromagnetic signals;

an antenna arranged to direct transmitted electromagnetic signals towards a surface of the product contained in the tank, and to return reflected electromagnetic signals resulting from reflections at impedance transitions encountered by the transmitted electromagnetic signals back to said transceiver;

a hollow waveguide connecting said transceiver and said antenna for guiding said electromagnetic signals therebetween;

a sealing member arranged to seal said waveguide to prevent fluid from passing into said waveguide from an interior of the tank; and processing circuitry connected to said transceiver and configured to determine said filling level based on said reflected electromagnetic signals, wherein:

said radar level gauge system further comprises a leak indication member being movably arranged inside said hollow waveguide in such a way that a force resulting from leakage of said fluid at said sealing member causes a movement of said leak indication member when acting thereon; and said hollow waveguide is configured in such a way that said movement of the leak indication member causes a change in at least one microwave propagation characteristic of the hollow waveguide.

2. The radar level gauge system according to claim 1, wherein said hollow waveguide is configured to increase reflection of said transmitted electromagnetic signals in the hollow waveguide following said movement of the leakage indication member.

3. The radar level gauge system according to claim 1, wherein said leakage indication member comprises a plug being movably arranged in said hollow waveguide to at least temporarily seal said hollow waveguide.

4. The radar level gauge system according to claim 3, wherein said plug is arranged to move in a wave-guiding direction of said hollow waveguide when subjected to said force resulting from leakage of said fluid at the sealing member.

5. The radar level gauge system according to claim 3, wherein said hollow waveguide has a portion with a reduced internal cross-section, and said plug is arranged at said portion having a reduced cross-section.

6. The radar level gauge system according to claim 5, wherein said portion with the reduced internal cross-section is defined by an at least partly electrically conductive sleeve member arranged in said hollow waveguide.

7. The radar level gauge system according to claim 3, wherein said plug is at least partly made of a dielectric material.

8. The radar level gauge system according to claim 3, comprising an at least partly dielectric spacing member arranged in said hollow waveguide,
wherein said plug is electrically conductive; and
said plug is spaced apart from a wall of said hollow waveguide by said spacing member.

9. The radar level gauge system according to claim 3, wherein said plug comprises a non-rotationally symmetrical electrically conductive member, said plug being arranged to rotate when being subjected to said force resulting from leakage of said fluid at the sealing member.

10. The radar level gauge system according to claim 9, wherein said non-rotationally symmetrical electrically conductive member is at least partly embedded in a dielectric material.

11. The radar level gauge system according to claim 3, wherein said plug is arranged in said hollow waveguide to perform a spiraling motion when being subjected to said force resulting from leakage of said fluid at the sealing member.

12. The radar level gauge system according to claim 3, wherein said plug comprises an impedance matching portion at least one of its ends.

13. The radar level gauge system according to claim 12, wherein said impedance matching portion has a smaller extension transversally to a direction of propagation of said electromagnetic signals than a main body of said plug.

14. The radar level gauge system according to claim 1, being configured to allow passage of fluid following a given movement of said leakage indication member.

15. The radar level gauge system according to claim 14, wherein said leakage indication member comprises a plug having a cut-out along at least a portion thereof to allow said passage of fluid.

16. The radar level gauge system according to claim 14, wherein said leakage indication member comprises a plug movably arranged in relation to a spacing member spacing apart said plug and a wall of said hollow waveguide, wherein at least one of said plug and said spacing member has a cut-out along at least a portion thereof to allow said passage of fluid.

17. A method of detecting leakage of fluid in a radar level gauge system for determining a filling level of a product contained in a tank, the radar level gauge system comprising a transceiver, an antenna and a hollow waveguide connecting the antenna and the transceiver, the hollow waveguide having a leakage indication member movably arranged therein, wherein the method comprises the steps of:
generating and transmitting electromagnetic signals using the transceiver;
propagating said transmitted electromagnetic signals through said hollow waveguide towards said antenna; and
detecting fluid leakage through said hollow waveguide by detecting a change in at least one microwave propagation characteristic of said hollow waveguide, caused by movement of said leakage indication member.

* * * * *